(12) United States Patent
MacLachlan et al.

(10) Patent No.: US 12,358,727 B2
(45) Date of Patent: Jul. 15, 2025

(54) MODULAR CONVEYOR BELT WITH MOVEABLE HINGE ROD RETAINER

(71) Applicant: Laitram, L.L.C., Harahan, LA (US)

(72) Inventors: Gilbert J. MacLachlan, Harahan, LA (US); Abraham L Miller, Picayune, MS (US); Benson Hall, Harahan, LA (US); Krissie K. Zambrano, Colchester, VT (US); Matthew Vulpetti, Metairie, LA (US); Matthew A. Lignieres, Raceland, LA (US); Angela Longo Marshall, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 101 days.

(21) Appl. No.: 18/032,649

(22) PCT Filed: Nov. 3, 2021

(86) PCT No.: PCT/US2021/057854
§ 371 (c)(1),
(2) Date: Apr. 19, 2023

(87) PCT Pub. No.: WO2022/098723
PCT Pub. Date: May 12, 2022

(65) Prior Publication Data
US 2024/0010436 A1     Jan. 11, 2024

Related U.S. Application Data

(60) Provisional application No. 63/111,302, filed on Nov. 9, 2020.

(51) Int. Cl.
*B65G 17/08* (2006.01)

(52) U.S. Cl.
CPC .......... *B65G 17/08* (2013.01); *B65G 2207/12* (2013.01)

(58) Field of Classification Search
None
See application file for complete search history.

(56) References Cited

U.S. PATENT DOCUMENTS

| 4,832,187 A | 5/1989 | Lapeyre |
| 5,020,659 A | 6/1991 | Hodlewsky |
| 5,058,732 A | 10/1991 | Lapeyre |

(Continued)

FOREIGN PATENT DOCUMENTS

| WO | 200047498 A1 | 8/2000 | |
| WO | 2012074383 A1 | 6/2012 | |
| WO | WO-2015025615 A1 * | 2/2015 | ............. B65G 17/08 |

OTHER PUBLICATIONS

Office Action, European Patent Application No. 21815799.8, mailed Apr. 22, 2025, European Patent Office, Netherlands.

*Primary Examiner* — Kavel Singh
(74) *Attorney, Agent, or Firm* — Catherine M. Bishop

(57) ABSTRACT

A conveyor belt module (20) includes a movable hinge rod retainer (220) that can be opened and closed without tools. The movable hinge rod retainer facilitates opening and rejoining of the conveyor belt (100) at one or more dedicated locations. In a first position, the hinge rod retainer locks a hinge rod (130) withing a hinge rod passageway. A user can easily move the hinge rod retainer to a second position in which the hinge rod passageway is open to allow removal of the hinge rod.

6 Claims, 16 Drawing Sheets

(56) References Cited

U.S. PATENT DOCUMENTS

| | | |
|---|---|---|
| 5,217,110 A | 6/1993 | Spangler et al. |
| 5,247,789 A | 9/1993 | Abbestam et al. |
| 5,293,989 A | 3/1994 | Garbagnati |
| 5,332,084 A | 7/1994 | Greve |
| 5,335,768 A * | 8/1994 | Schladweiler ......... B65G 47/52 |
| | | 474/224 |
| 5,379,883 A * | 1/1995 | Damkjaer .............. B65G 17/08 |
| | | 198/853 |
| 5,435,435 A * | 7/1995 | Chiba .................... B65G 17/08 |
| | | 198/853 |
| 5,482,156 A | 1/1996 | Damkjaer |
| 5,598,916 A | 2/1997 | Horton et al. |
| 5,634,550 A | 6/1997 | Ensch et al. |
| 5,899,322 A | 5/1999 | Gamble, Jr. |
| 5,996,776 A | 12/1999 | van Zijderveld |
| 6,196,379 B1 | 3/2001 | Van Esch et al. |
| 6,308,825 B1 | 10/2001 | Nakamura |
| 6,499,587 B1 | 12/2002 | Greve |
| 6,763,936 B2 | 7/2004 | Marsetti et al. |
| 6,814,223 B1 | 11/2004 | Verdigets et al. |
| 6,857,516 B1 | 2/2005 | Verdigets |
| 7,255,227 B2 | 8/2007 | Melancon |
| 8,607,967 B2 | 12/2013 | Neely et al. |
| 8,939,279 B2 * | 1/2015 | Porter .................... B65G 39/20 |
| | | 198/779 |
| 9,550,628 B2 | 1/2017 | Wunsch |
| 10,183,809 B2 | 1/2019 | Richardson |
| 2012/0061213 A1 | 3/2012 | Memoli et al. |
| 2014/0190799 A1 | 7/2014 | Porter et al. |

\* cited by examiner

MODULAR CONVEYOR BELT WITH MOVEABLE HINGE ROD RETAINER

RELATED APPLICATIONS

The present application claims priority to U.S. Provisional Patent Application No. 63/111,302, filed Nov. 9, 2020, entitled "Modular Conveyor Belt with Moveable Hinge Rod Retainer", the contents of which are herein incorporated by reference.

FIELD OF THE INVENTION

The present invention relates to the field of power-driven conveyors. More particularly, the present invention relates to a hinge rod retention and access structure in plastic conveyor belts constructed of rows of modules pivotally interconnected by hinge rods.

BACKGROUND OF THE INVENTION

Modular plastic conveyor belts are widely used in various industries to convey products. Modular plastic conveyor belts are constructed of a series of rows of linked belt modules. Hinge elements along opposite ends of each row interleave with hinge elements of consecutive rows. A hinge rod inserted in the interleaved hinge elements connects the rows together at hinge joints into an endless conveyor belt loop, allowing articulation of the modules relative to each other. Various schemes can be used to prevent hinge rods from working out of the lateral passageways during belt operation. Many rod retention means require tools and—or present difficulty in providing access to the hinge rod to allow removal of the hinge rod in case opening of the conveyor belt, for repair, removal of certain sections, cleaning or another action, is required.

Dedicated access points can be used in certain locations throughout the length of a conveyor belt to allow an operator to easily separate the belt, make repairs or remove sections, and then reconnect the belt without the need for replacement components or special tools.

SUMMARY OF THE INVENTION

A movable hinge rod retainer facilitates opening and rejoining of a conveyor belt at one or more dedicated locations. In a first position, the hinge rod retainer locks a hinge rod within a hinge rod passageway. A user can easily move the hinge rod retainer to a second position in which the hinge rod passageway is open to allow removal of the hinge rod. The hinge rod retainer is connected to a module of the conveyor belt, and remains connected to the module regardless of the position of the hinge rod retainer.

According to one aspect, a conveyor belt module comprises a body and a pivotable hinge rod retainer for a hinge rod. The body extends in thickness from a top conveying surface to an opposite bottom surface, laterally from a first edge to a second edge and longitudinally from a first end to a second end. The body includes a first set of hinge elements spaced apart along the first end and defining a first rod passageway. The pivotable hinge rod retainer pivots between a closed position blocking the first rod passageway and an open position in which the first rod passageway is open.

According to another aspect, a conveyor belt module comprises a body and a movable hinge rod retainer for a hinge rod. The body extends in thickness from a top conveying surface to an opposite bottom surface, laterally from a first edge to a second edge and longitudinally from a first end to a second end. The body includes a first set of hinge elements spaced apart along the first end and defining a first rod passageway. The movable hinge rod retainer moves between a first position in which the first rod passageway is open and an end of the hinge rod extends from the first rod passageway and a second position in which the first rod passageway is blocked and the hinge rod is locked within the first rod passageway.

DETAILED DESCRIPTION

A modular conveyor belt includes a movable hinge rod retainer at a selected location for easily separating and joining the belt at the selected location for cleaning, repair, or removal. The invention will be described below relative to certain illustrative embodiments, though those skilled in the art will recognize that the invention is not limited to the illustrative embodiments.

Figure 1:
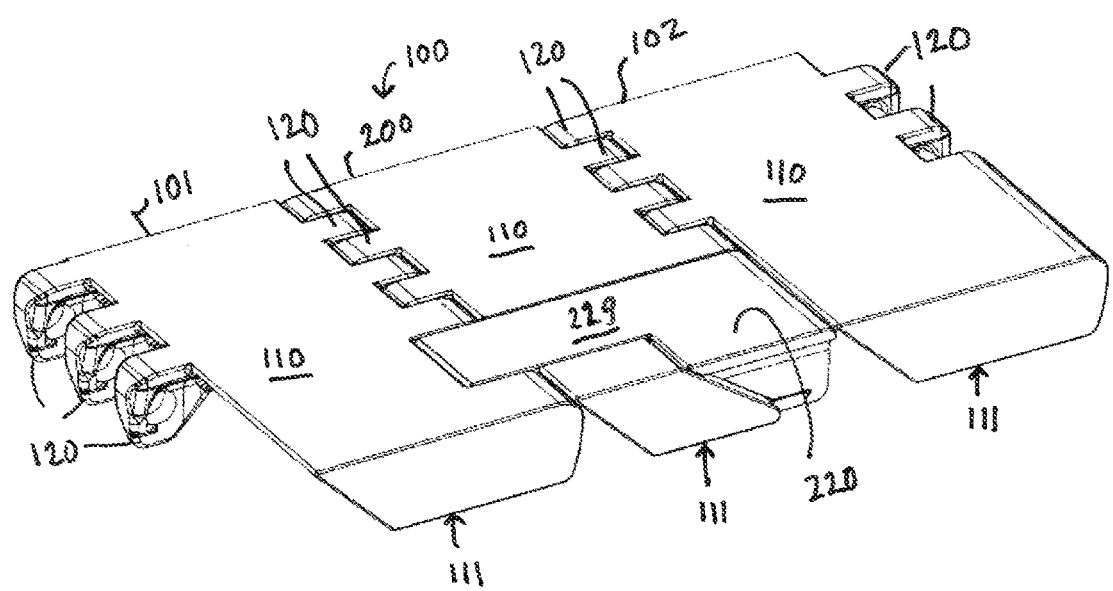
FIG. 1 is an isometric top view of a portion of a modular conveyor belt employing a pivotable hinge rod retainer in a closed position, according to an embodiment.
Figure 2:
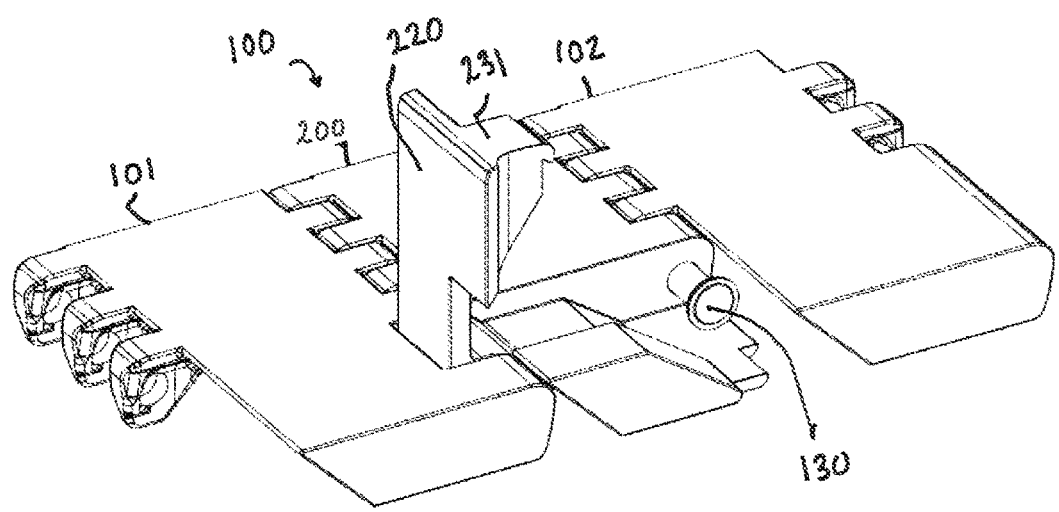
FIG. 2 shows the portion of FIG. 1 when the pivotable hinge rod retainer is in an open position.

FIGS. 1 and 2 show a portion of a conveyor belt comprising hingedly connected modules 101, 200, 102. The hingedly connected conveyor belt modules, and others joined in series, form an endless conveyor belt. The central module 200 may form an access module for selectively opening and closing the conveyor belt. The access module 200 includes a pivotable hinge rod retainer 220 on an outer edge portion. The hinge rod retainer 220 provides access to a hinge rod 130 that joins adjacent conveyor belt modules 102, 200 together and is connected to conveyor belt in both an open position and a closed position. In a closed position, as shown in FIG. 1, the hinge rod retainer covers the outer end of the hinge rod 130 and prevents escape of the hinge rod 130 to hold the adjacent modules 102, 200 together. In an open position, shown in FIG. 2, the hinge rod retainer 220 exposes the end of the hinge rod 130, allowing a user to easily grasp and remove the hinge rod to open the conveyor belt. The hinge rod retainer 220 can be easily moved between the open and closed position, and the hinge rod removed, without the use of tools.

The access module 200 can form a dedicated access location for the conveyor belt. The illustrative modular conveyor belt 100 is made up of a series of rows, with each row consisting of multiple modules arranged side-by-side, typically in a brick-lay pattern from row to row, across the width of the belt. Alternatively, a row can comprise a single conveyor belt module defining the width of the belt. Examples of suitable modular conveyor belts are those manufactured and sold, for example, by Intralox, LLC of Harahan, La., USA. The belt modules are conventionally made by injection-molding thermoplastic materials such as polypropylene, polyethylene, acetal, nylon, or composite polymers, to name a few, though other materials may be used.

Each conveyor belt module 101, 102, 200 comprises a body extending in thickness from a top conveying surface 110 to an opposite surface 111, which may include a drive element, such as a drive bar, for engaging a conveyor drive, such as a sprocket. The drive element can alternatively be located on the sides of the modules or in another suitable location, or comprise an opening or pocket in the module configured to engage a tooth on the drive. The modules 101, 102, 200 extend in width from a first side to a second side and in length in a direction of belt travel from a first end to a second end. A series of linking elements, shown as spaced-apart hinge elements 120, extend longitudinally outward from each end of the module body. The hinge elements 120 on one end of the module body are laterally offset from the hinge elements 120 at the other end. The gaps between laterally consecutive hinge elements are sized to receive the hinge elements of modules in an adjacent row of modules in the conveyor belt, such that the openings in the hinge elements align to form a hinge passageway extending along a hinge axis. Hinge rods 130 extending laterally through the hinge passageways formed by the aligned openings in the interleaved hinge elements connect the modules 101, 200, 102 to each other.

The hinge elements 120 allow articulation of the modules relative to each other about the hinge rods 130, enabling the conveyor belt to conform to the sprocket or other belt-guiding devices. The distance between consecutive hinge axes is defined as the belt pitch, which is also the distance between consecutive drive elements. Each illustrative conveyor belt module 101, 200, 102 includes articulating hinge elements 120 at each end.

The modular conveyor belt 100 conveys articles atop the conveying surfaces 110 of the modules 101, 200, 102 along an upper carryway portion of the conveyor. The belt is trained around sprockets (or other reversing structure) mounted on each end of the carryway, and returns along a returnway below the carryway. Such conveyor belt modules are known in the art and are not limited to the illustrative flat-top modules. One skilled in the art will recognize that the body of the modules may comprise any suitable configuration, and is not limited to the illustrative embodiment. For example, the body may comprise planar structure that is solid, perforated, "open grid," flat, shaped or otherwise configured.

Figure 3:
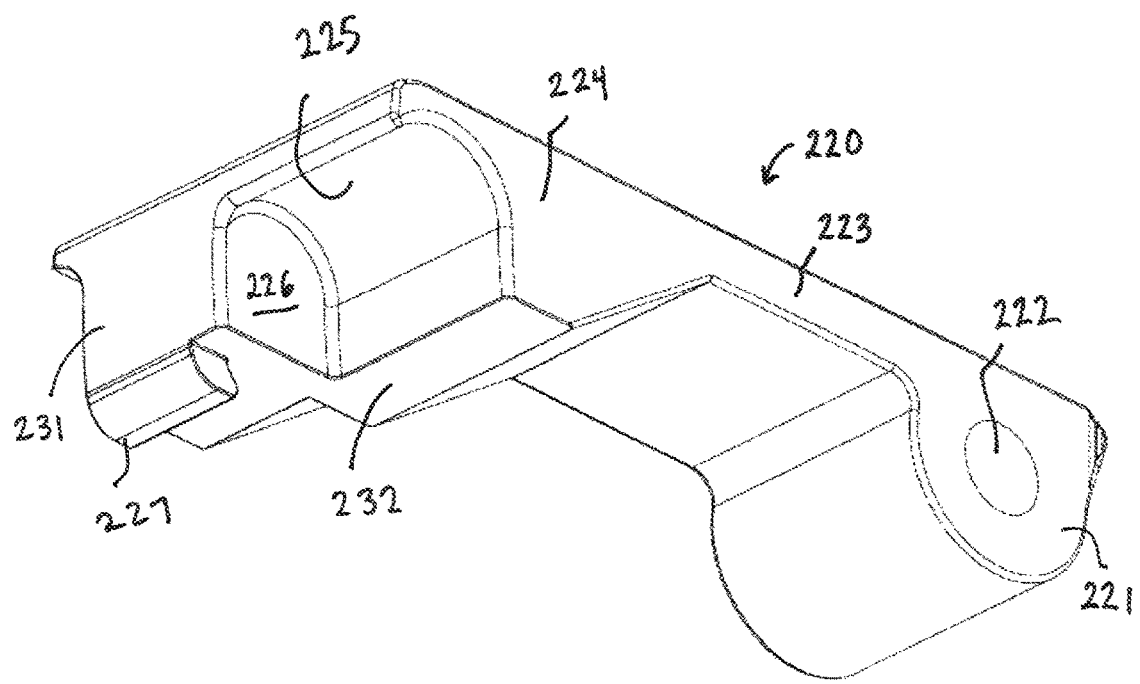
FIG. 3 is an isometric bottom view of the pivotable hinge rod retainer of FIG. 1.
Figure 4:
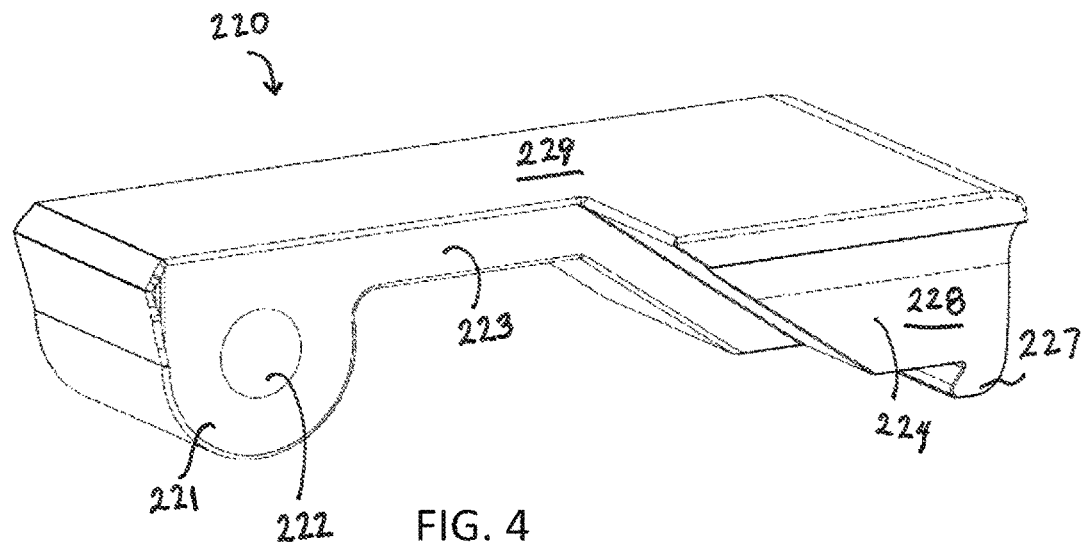
FIG. 4 is an isometric top view of the pivotable hinge rod retainer of FIG. 3.

The illustrative hinge rod retainer 220, shown in detail in FIGS. 3 and 4, pivots between the open and closed position, and snap-fits into place in the closed position. The illustrative hinge rod retainer 220 comprises a base 221 including an opening 222 for receiving a second hinge rod that extends through a second set of hinge elements on the access module 200 and connects a first module 101 to the access module 200. The second hinge rod forms a pivot rod for the hinge rod retainer 220. Alternatively, a separate pivot rod in the module may be used to pivotally mount the hinge rod retainer 220. A neck 223 connects to a head 224 that includes a recess 225 for receiving and containing the end of the hinge rod 130. The outer side of the recess 225 is closed by a wall 226 for blocking the hinge rod 130. A latching tab 227 extends from the bottom surface 232 of the head 224. An outer side edge 228 of the head 224 is shaped to allow a user to access and pull up on the head 224 with a finger, thumb or other mover. Then, the user can easily grasp the end of the hinge rod 130 and remove it from the hinge passageway to open the conveyor belt. A front surface 231 of the head 224 may be shaped to facilitate movement between the open and closed position. A top surface 229 of the hinge rod retainer 220 is configured to be flush with the top surfaces 110 of the hinge modules 101, 200, 102 when in the closed position.

Figure 5:
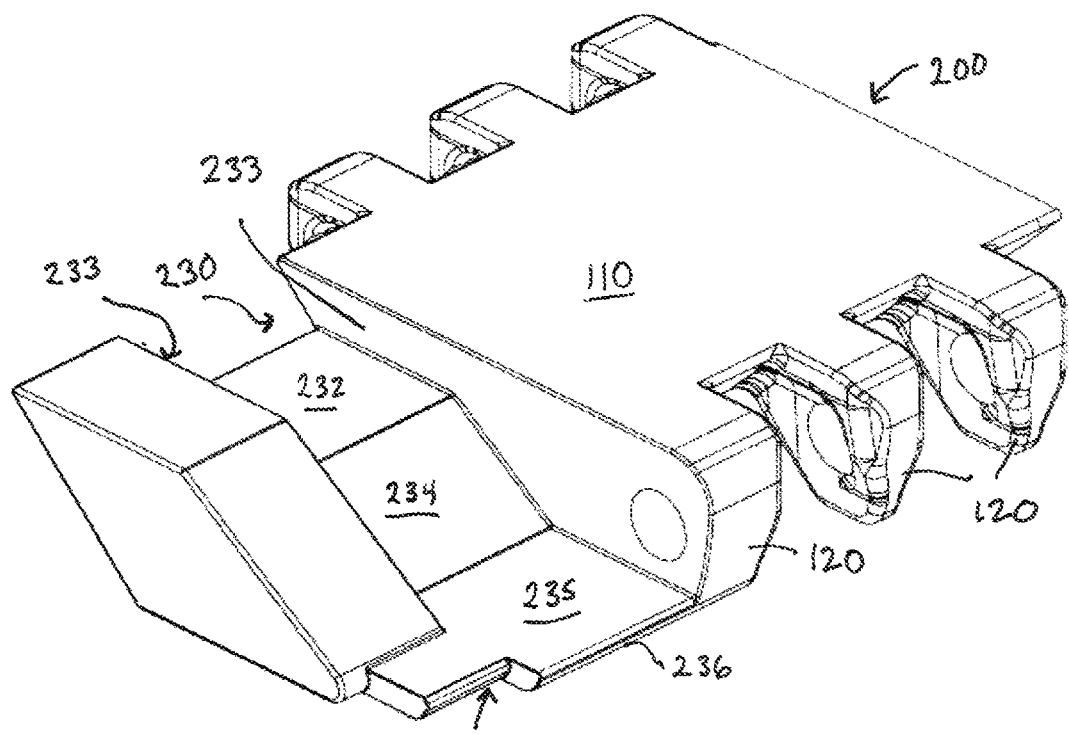
FIG. 5 is an isometric top view of an access module in the modular conveyor belt of FIG. 1.

Referring to FIG. 5, the access module 200 includes a recess 230 for receiving the neck 223 and head 224 of the rod retainer 220. The recess 230 includes side walls 233, a substantially horizontal surface 232 for abutting a bottom surface of the neck 223, a sloped surface 234 for abutting a rear surface of the head 224. The recess 230 terminates in a flat bottom surface 235 that extends to the front edge 236 of the module. The front edge 236 includes a niche 237 with which the latching tab 227 engages by a snap-fit connection to secure the hinge rod retainer 220 in the closed position.

The illustrative latching tab 227 and niche 237 are configured so that the hinge rod retainer can only be opened or closed when the modules 101, 200, 102 are slightly collapsed relative to each other. This prevents the hinge rod retainer from accidentally swinging open during operation of the conveyor belt, a time in which the conveyor belt is under tension and the modules are expanded. Other suitable means for securing the hinge rod retainer 220 in place may be used and the invention is not limited to the illustrative latching tab and niche.

Figure 6:
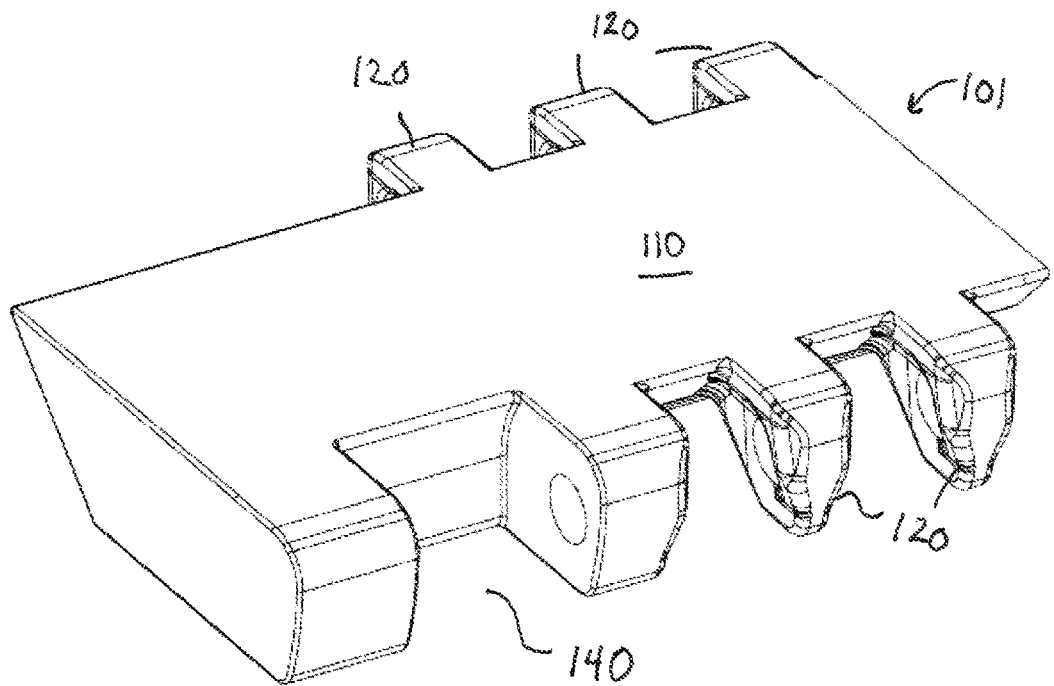
FIG. 6 is an isometric top view of a conveyor belt module including a space for the pivotable hinge rod retainer of FIG. 1.

Referring to FIG. 6, the first module 101 includes a space 140 in in an edge portion for rotatably housing the base 221. The space 140 intersects the hinge passageway formed by hinge elements 120, so that a hinge rod extending through the passageway to connect module 101 to access module 200 can also pivotally mount the hinge rod retainer 220 for selectively blocking and accessing a hinge rod 130 connecting access module 200 to another module 102.

Alternatively, a separate pivot rod for mounting the hinge rod retainer 220 may be fully incorporated into the access module 200. In such an embodiment, the first module 101 would not require the space 140 and could be identical to the module 102.

In one embodiment, the rod retainer 220 can be a different color from the modules and—or contain indicia, such as signs, words or other markings, indicating that the access module 200 is the preferred place to open and—or close the conveyor belt 100 and—or providing instructions for opening and—or closing the conveyor belt.

Figure 7:
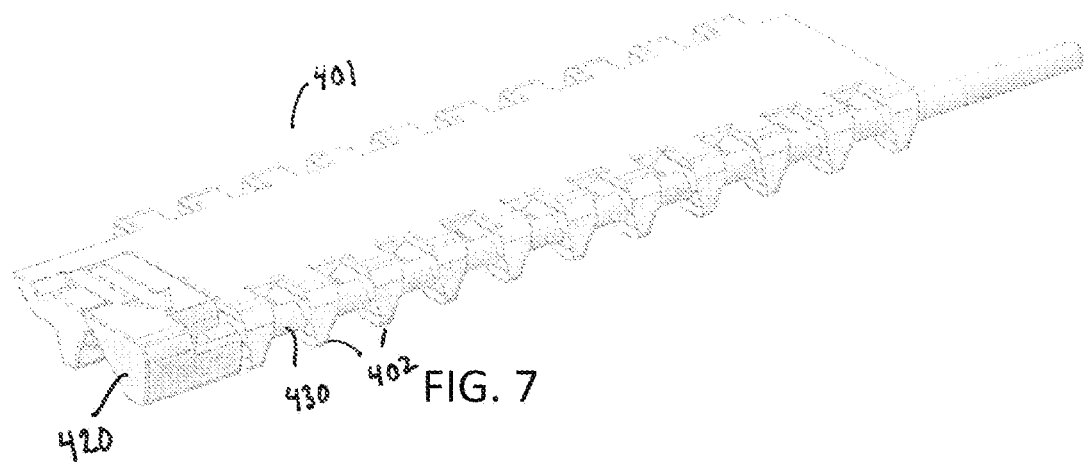
FIG. 7 is an isometric view of a conveyor belt module including a pivotable hinge rod retainer in a closed position according to another embodiment.
Figure 8:
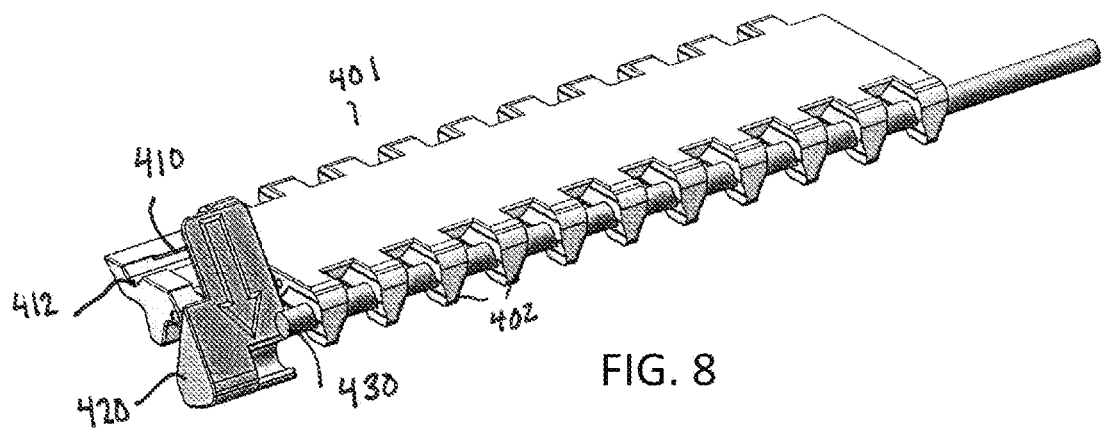
FIG. 8 shows the conveyor belt module of FIG. 7 with the pivotable hinge rod retainer in an open position.
Figure 9:
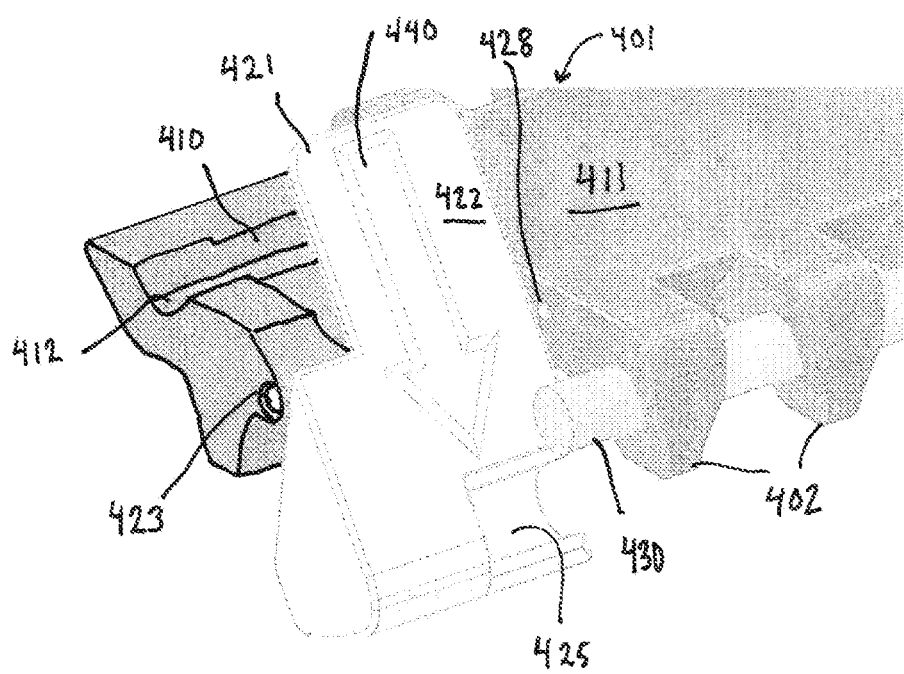
FIG. 9 is a close-up view of the pivotable hinge rod retainer of FIG. 8.

FIGS. 7-9 show another embodiment of a pivotable hinge rod retainer for a modular conveyor belt. The illustrative rod retainer 420 comprises a pivotable latch pivotally mounted and connected to a side edge of a module 401 that can be rotated to expose and access a hinge rod 430 connecting the module 401 to another module via hinge elements 402, facilitating removal of the hinge rod to, for example, open the conveyor belt.

The pivotable rod retainer comprises a lifting tab 421 configured to be received in a recess 410 on the module 401. The lifting tab 421 has a top surface 422 configured to be flush with the top conveying surface 411 of the module when the pivotable rod retainer is in a closed position, as shown in FIG. 4. The illustrative lifting tab 421 also includes an arrow 440 to instruct a user how to open the pivotable rod retainer 420 to expose the hinge rod 430. The arrow can also be used to show a preferred run direction of a conveyor belt including the module 401, to prevent the lifting tab 421 from becoming a catchpoint.

The recess 410 includes an access channel 412 to allow a user to easily lift the lifting tab 421. A pivot rod 423 extends across the recess 410, parallel to the hinge rod 430, for mounting the pivotable rod retainer 420. Opposite the lifting tab 421, the rod retainer 420 includes a body that fits into an edge space in the module 401. The body includes a rod channel 425 having a closed end for cradling and blocking the end of the hinge rod 430 and preventing migration of the hinge rod 430 in a closed position.

The pivotable rod retainer 420 may include a latch, such as a retractable detent 428 for locking the pivot rod retainer in the closed position. In the closed position, as shown in FIG. 7, the closed rod channel 425 retains the hinge rod within the hinge passageway. In the closed position, the top surface of the rod retainer, including the lifting tab, is flush with the top conveying surface of the module. The tip of the lifting tab 421 may latch under a lip in the recess 410.

To open the conveyor belt and remove the hinge rod 430, a user lifts the lifting tab 421 to pivot the body of the rod retainer about the pivot rod 423. This exposes the end of the hinge rod 430 and allows a user to grasp, pull and remove the hinge rod 430.

FIGS. 10-15 show another embodiment of a pivotable hinge rod retainer 520 that can easily provide access to a hinge rod as well as retain a hinge rod within a hinge passageway. The pivotable hinge rod retainer 520 is housed in a compartment 510 within a conveyor belt module 500 that is adjacent to an outer side edge of the module and intersects a hinge passageway formed by aligned hinge elements 502. The pivotable hinge rod retainer 520 remains connected to the module 500 whether in an open position or a closed position.

Figure 12:
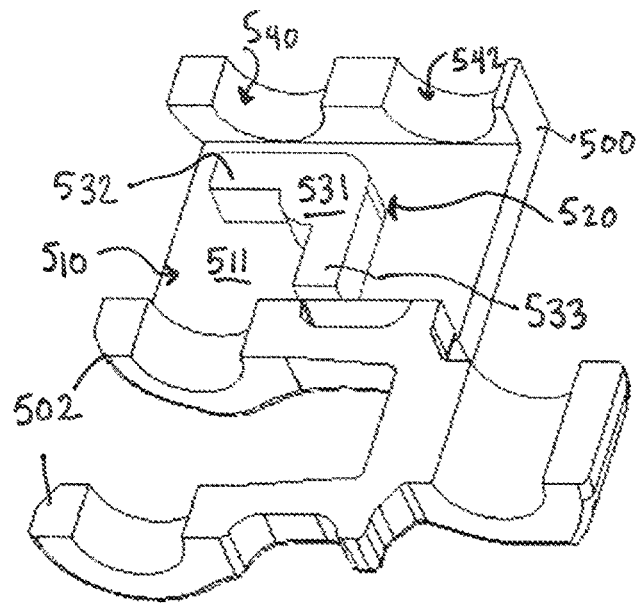
FIG. 12 is a cross-sectional view of the outer portion of the conveyor belt module of FIG. 10 with the hinge rod retainer in a closed position.
Figure 13:
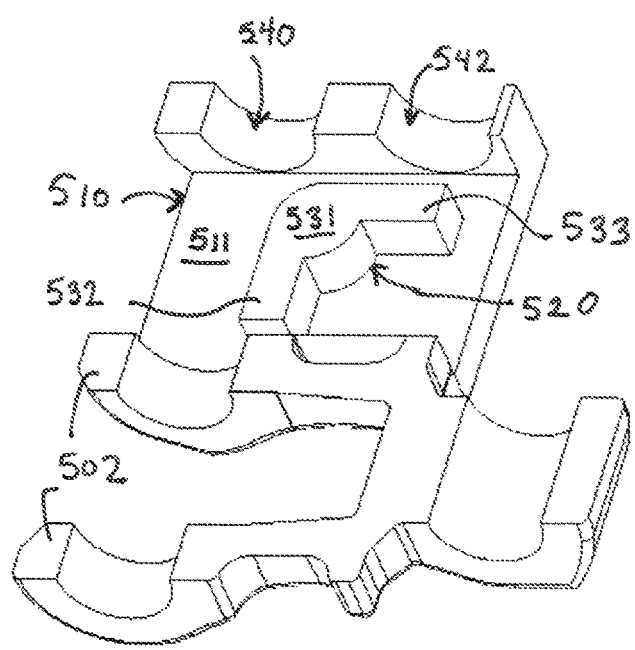
FIG. 13 is a cross-sectional view of the outer portion of FIG. 12 with the pivotable hinge rod retainer in an open position.

As shown in FIGS. 12 and 13, the pivotable rod retainer 520 comprises an L-shaped element having a central connecting portion 531, a first leg 532 and a second leg 533. The central connecting portion 531 is mounted on a pivot rod that extends from a wall, such as the floor 511, of the compartment 510, allowing the pivotable rod retainer 520 to pivot about the pivot rod between a closed position and an open position. Alternatively, integral pivot nubs extend from the central connecting portion and are rotatably received in openings in the module to allow the rod retainer to pivot within the compartment 510.

Figure 10:
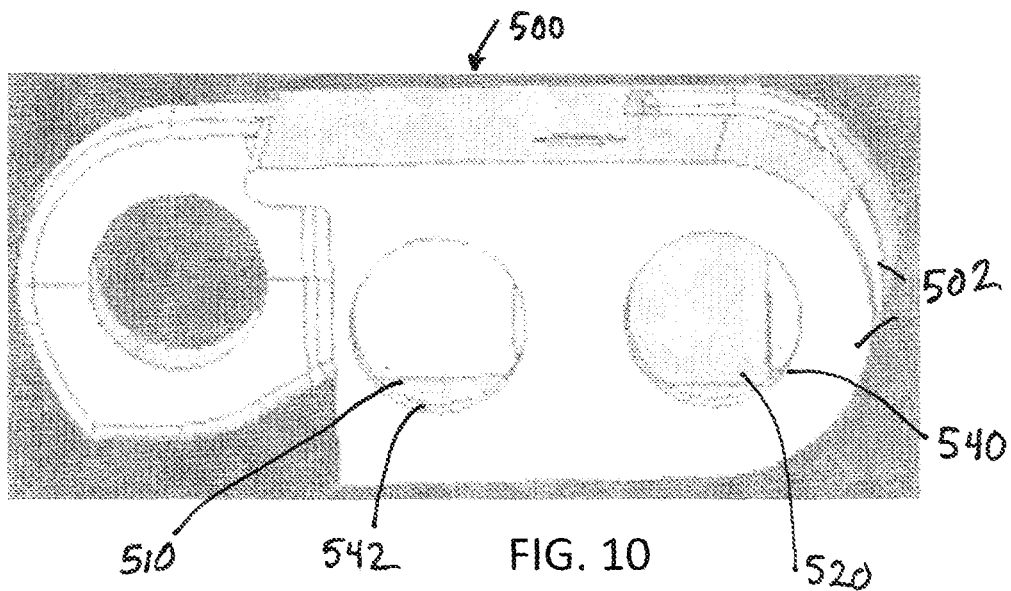
FIG. 10 is a side view of a conveyor belt module including a pivotable hinge rod retainer in a closed position according to another embodiment.
Figure 11:
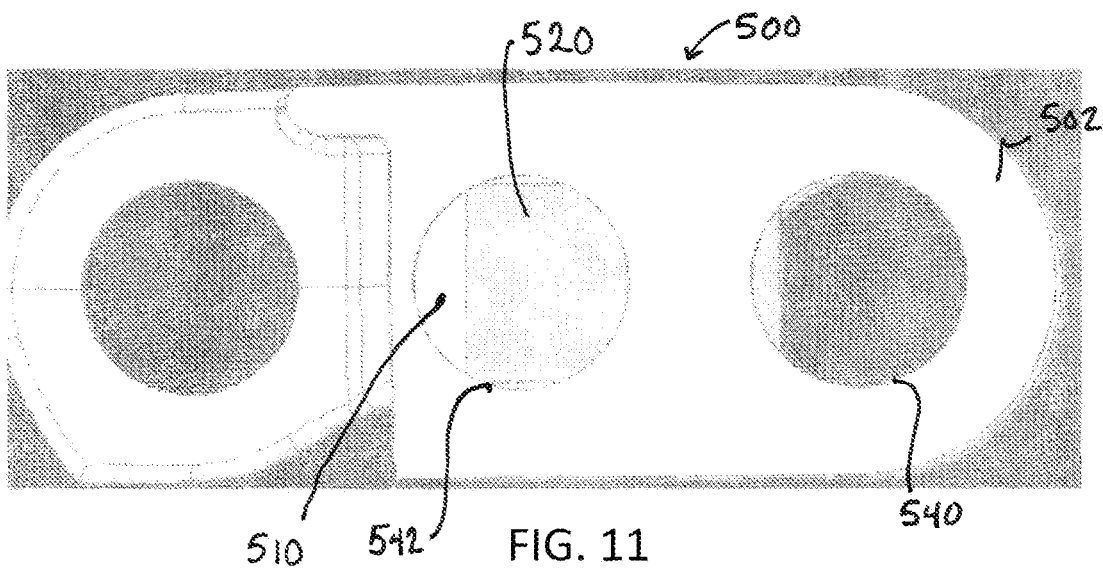
FIG. 11 is a side view of the conveyor belt module of FIG. 10 with the pivotable hinge rod retainer in an open position.

In a closed position, as shown in FIGS. 10 and 12, the first leg 532 extends across the hinge passageway to prevent an inserted hinge rod from escaping the hinge passageway. In the open position, shown in FIGS. 11 and 13, the first leg 532 is pivoted into a non-blocking position. In the non-blocking position, the first leg 532 extends alongside and parallel to the hinge passageway, allowing a hinge rod to enter or exit the hinge passageway. In the non-blocking position, the second leg 533 is pushed towards the outer edge of the module. The insertion of the hinge rod may push the first leg 532 to pivot the rod retainer into the open position and allow passage of the hinge rod into or out of the hinge passageway. A user may use a tool, such as another hinge rod, to push the hinge rod out of the hinge passageway through an opening in the opposite side of the conveyor belt.

The outer edge of the module includes two openings 540, 542 into the compartment 510. A first opening 540 aligns with the hinge passageway formed by hinge elements 502. The hinge rod passes through the first opening 540 to enter and exit the hinge passageway. The second opening 542 is adjacent to the first opening 540 and can be used to move the rod retainer 520 from an open position to a closed position. For example, a user can insert another hinge rod, a screwdriver or other appropriately sized device through the second opening 542 to push the second leg 533 down, rotating the first leg 532 into the blocking position. The user can similarly open the hinge passageway by pushing the first leg 532 back into the open position by inserting a device through the first opening 540.

The side walls of the compartment 510 can be open to provide access to the compartment 510.

The pivotable rod retainer 520 may include one or more latches for securing the retainer in an open and—or closed position. Alternatively, frictional interferences may keep the rod retainer in an open or closed position.

Figure 14:
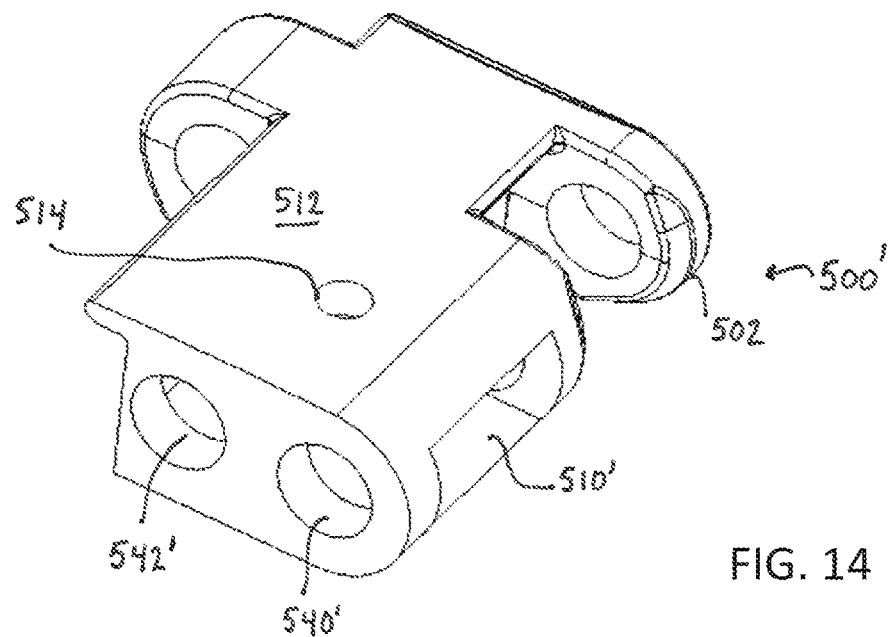
FIG. 14 is an isometric view of an outer portion of a conveyor belt module including openings for mounting a pivotable hinge rod retainer.
Figure 15:
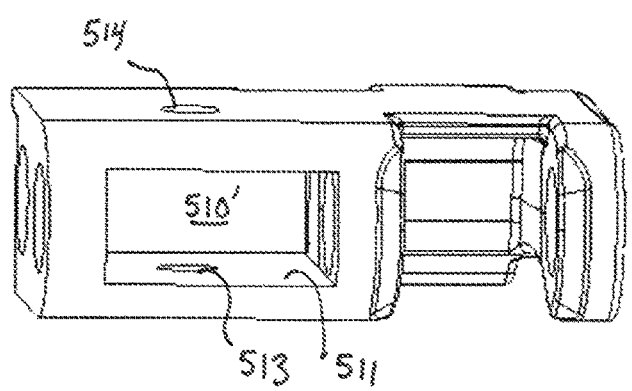
FIG. 15 is a side view of the outer portion of FIG. 14.
Figure 16:
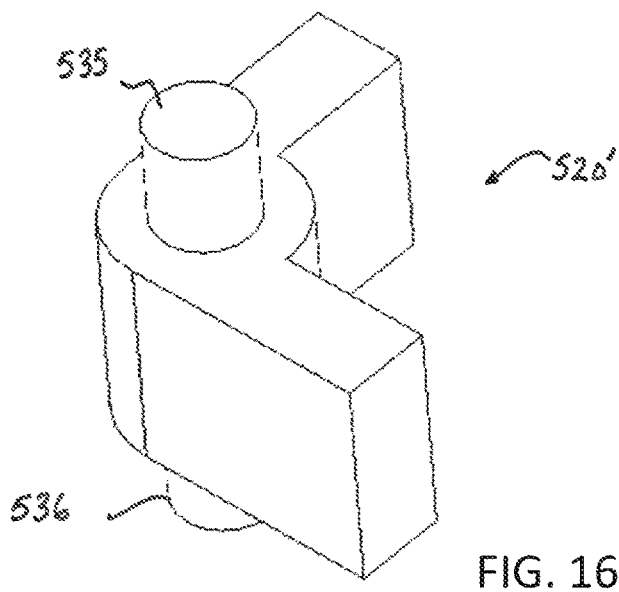
FIG. 16 is an isometric view of a pivotable hinge rod retainer including pivot nubs mounted in the openings of the module of FIG. 14.

Referring to FIGS. 14-16, in one embodiment, a module 500' housing an L-shaped, pivotable rod retainer 520' includes pivot nub-receiving openings 513, 514 in the top wall 512 and bottom wall 511 of the compartment 510' housing the pivotable rod retainer 520'. A rod retainer 520' may include integral pivot nubs 535, 536 for pivotally mounting the rod retainer 520' in the compartment 510' by inserting the pivot nubs in the openings 513, 514. Openings 540', 542' can be used to access the compartment 510', as described above.

Figure 17:
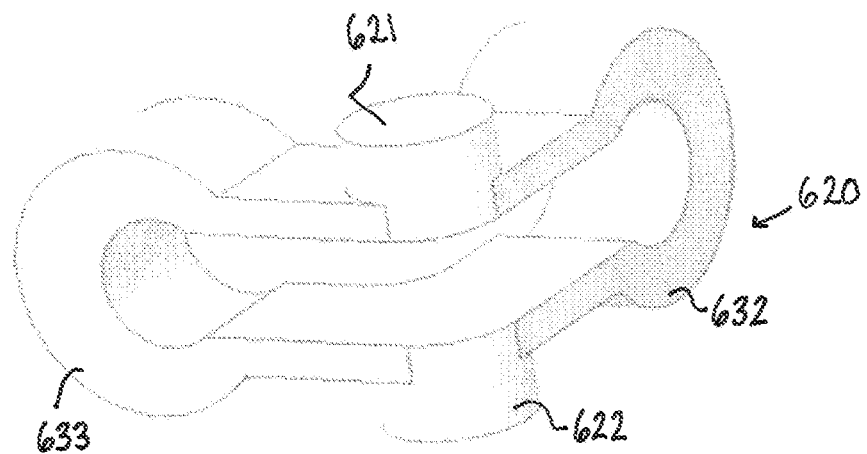
FIG. 17 is an isometric view of a pivotable hinge rod retainer according to another embodiment.
Figure 18:
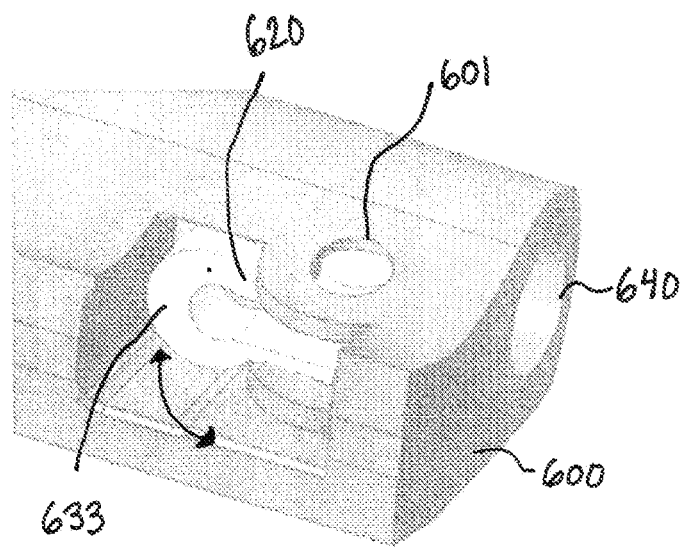
FIG. 18 is an isometric view of a conveyor belt module including the pivotable hinge rod retainer of FIG. 17 in a closed position.

FIGS. 17 and 18 show another embodiment of a pivotable rod retainer 620 for selectively blocking a hinge rod passageway of a conveyor belt module 600. The hinge rod retainer 620 includes integrated pivot nubs 621, 622 configured to be rotatably received in circular openings 601 in the module 600. Legs 632, 633 extend from the pivot nubs. A first leg 632 selectively blocks a hinge passageway, accessible via opening 640. A second leg 633 may be activated upon by an activating device to move the first leg 632 into a locked position, shown in FIG. 18.

As shown in FIG. 18, the compartment 610 housing the pivotable rod retainer 620 is open on a side to provide access to the second leg 633. A user pushes the second leg 633 into the compartment 610 to block the hinge passageway with the first leg 632. The hinge passageway can be opened by pushing on the first leg 632 through opening 640, pivoting the legs 632, 633 about the pivot nubs 621, 622 and opening the hinge passageway.

The illustrative first and second legs 632, 633 have a substantially hollow key-hole shape, with the hollow portion enabling the rotatable rod retainer 620 to flex, if necessary.

A latch or other suitable device may be included to secure the rod retainer 620 in the open and—or closed position.

Figure 19:
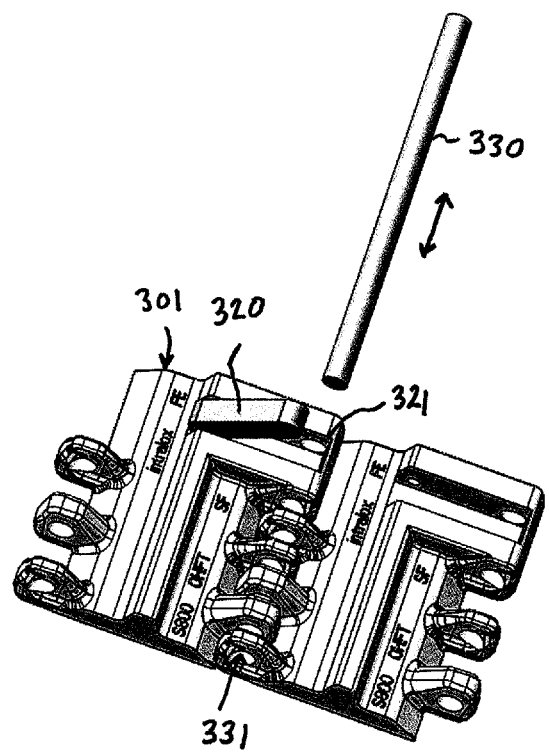
FIG. 19 is a bottom view of a pair of hingedly-connected conveyor belt modules including a pivotable hinge rod retainer according to another embodiment.

FIG. 19 shows another embodiment of a pivotable hinge rod retainer for a conveyor belt module 301. In FIG. 19, a pivoting latch 320 selectively blocks a hinge rod passageway 331 to prevent a hinge rod 330 from escaping. The pivoting latch 320 is pivotally mounted in a recess 321 in the bottom surface of the module. A pivot rod extending parallel to the hinge passageway is embedded in the recess 321 to mount the latch 320. The pivot rod extends into the module 301. The pivoting latch 320 may include an embedded magnet that attracts to an embedded magnet or other element embedded below the recess 321 to secure the pivoting latch 320 in a closed position, which prevents the hinge rod 330. A user can lift the pivoting latch against the attraction of the magnets to open the hinge passageway and allow access to the hinge rod, while the pivoting latch 320 remains connected to the module 301.

Figure 20:
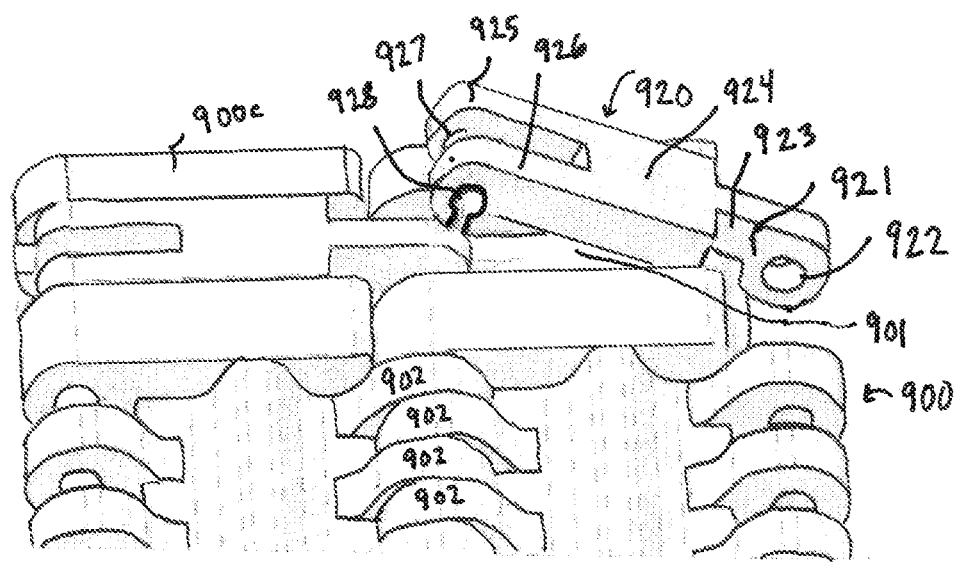
FIG. 20 is an isometric view of a pair of hingedly connected conveyor belt modules, including a snap-fit pivotable rod retainer.
Figure 21:
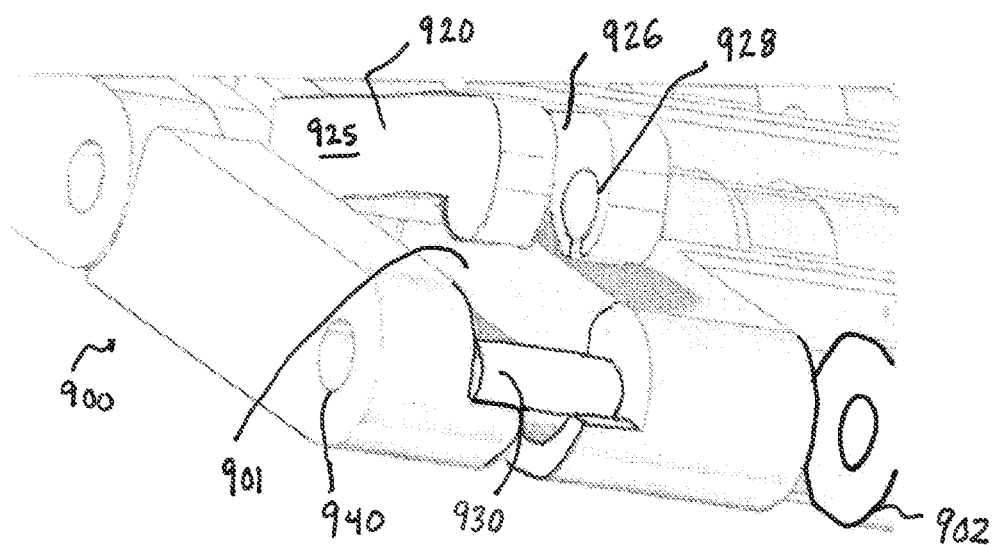
FIG. 21 is another view of the snap-fit pivotable rod retainer of FIG. 21.
Figure 22:
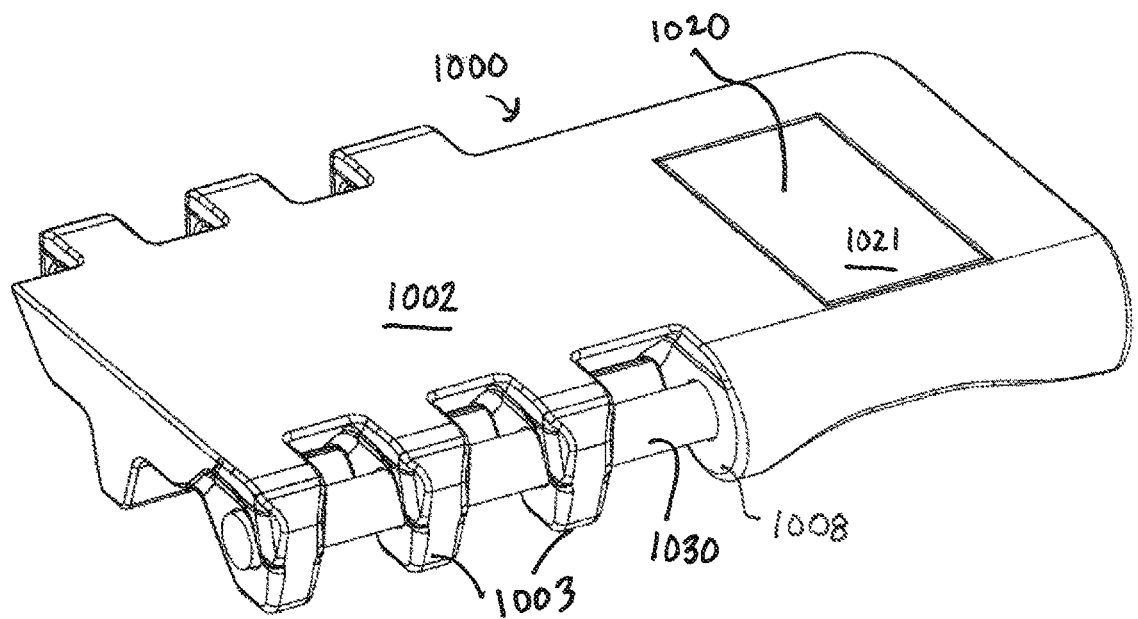
FIG. 22 is an isometric top view of a conveyor belt module including a pivotable hinge rod retainer in a closed position.

Referring to FIGS. 20 and 21, in another embodiment, a pivotable rod retainer 920 for a conveyor belt module 900 snaps onto a hinge rod 930 to selectively lock the hinge rod within a hinge passageway formed by aligned hinge elements 902. The hinge rod retainer 920 can be seated in a recess 901 formed on the bottom side, outer edge of the module 900. The pivotable rod retainer includes a base 921 including an opening 922 for pivotally mounting the rod retainer on a first hinge rod connecting the module 900 to another module. A neck 923 connects to a body 924 that splits to form two arms 925, 926 including keyhole-shaped openings 927, 928 for snapping onto a second hinge rod 930 connecting the module 900 to a third module 900c. The outer wall of the outer arm 925 can solid, so that the keyhole-shaped opening 927 is closed to block the hinge rod. An opening 940 in the outer edge of the module 900 aligns with the hinge passageway to allow insertion and removal of the hinge rod into the passageway. The space between the arms 925, 296 can receive a base and neck of an adjacent pivotable rod retainer 920'.

In an open position, the pivotable rod retainer 920 exposes the end of the hinge rod 930, allowing a user to access and push the hinge rod through the opening 940 and out of the passageway. To lock a hinge rod within the passageway, a user rotates the body 924 about the base 921 and snaps the openings 927, 298 onto the hinge rod 930. A user can easily open the pivotable rod retainer 920 by pulling the openings 927, 928 out of engagement with the hinge rod 930.

Figure 23:
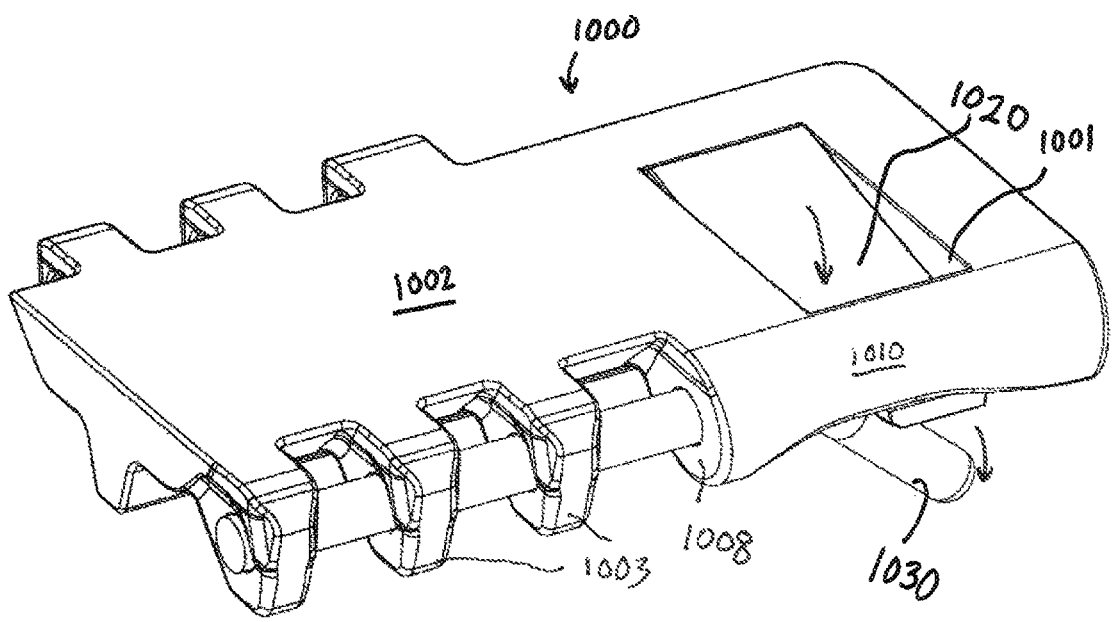
FIG. 23 is an isometric top view of the conveyor belt module of FIG. 22 in an open position.
Figure 24:
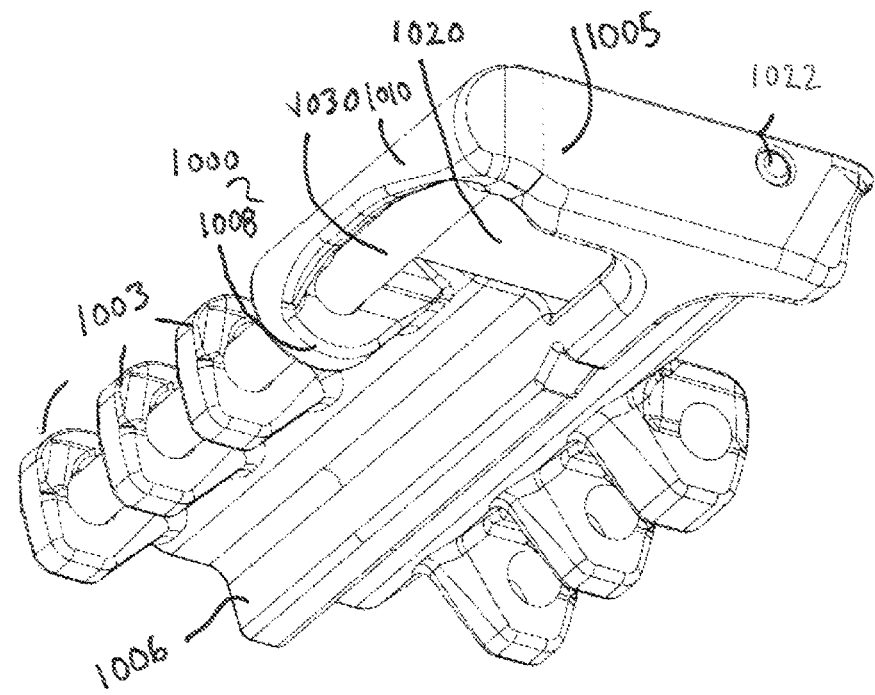
FIG. 24 is an isometric bottom view of the conveyor belt module of FIG. 22 with the pivotable rod retainer in a closed position.
Figure 25:
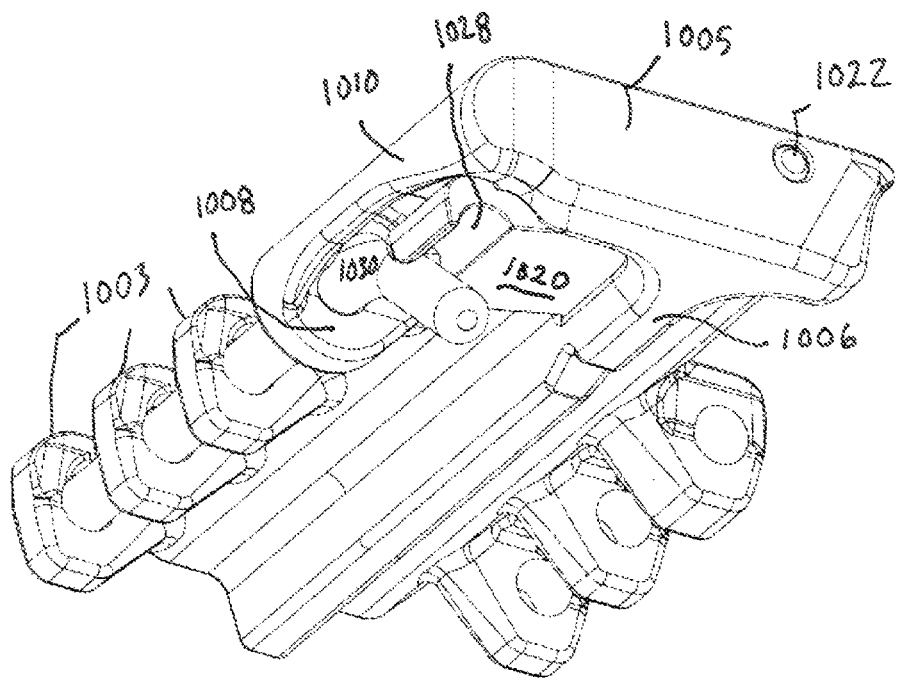
FIG. 25 is an isometric bottom view of the conveyor belt module of FIG. 22 with the pivotable rod retainer in an open position.

FIGS. 22-25 show another embodiment of a conveyor belt module 1000 including a pivotable hinge rod retainer 1020 for selectively securing and providing access to a hinge rod 1030 that connects the module 1000 to an adjacent module in a modular conveyor belt. The illustrative pivotable hinge rod retainer 1020 comprises a trap door hingedly connected to and mounted within an opening 1001 of the body of the module 1000. The illustrative trap door 1020 is hingedly connected to the module via a pivot rod 1022 embedded in the module. In a closed position, shown in FIGS. 22 and 24, the upper surface 1021 of the trap door is flush with the top conveying surface 1002 of the module 1000. In the closed position, the hinge rod 1030 is held in a latched position and cannot be removed. To expose the end of the hinge rod 1030 to facilitate removal, a user pushes the trap door 1020 down, as shown in FIGS. 23 and 25, which pushes the end of the hinge rod 1030 into an exposed position, allowing a user to grasp and remove the hinge rod.

The module 1000 includes a solid side edge 1005 that blocks the hinge rod 1030 in the closed position. As shown in FIGS. 24 and 25, the solid side edge 1005 intersects a laterally extending drive bar 1006. An edge hinge element 1008 inset from the solid side edge 1005 has an opening that aligns with the openings of the hinge elements 1003. A web 1010 extends from the edge hinge element 1008 to the solid edge 1005. The curved web 1010 is continuous with the top surface 1002 of the module and extends around the circumference of the edge hinge element 1008 to form a nose extending laterally along the end of the module at the side edge region. A region between the solid side edge 1005, web 1010, edge hinge element 1008 and drive bar 1006 houses the end of the hinge rod 1030. The trap door 1020 is pivotally mounted at the top of this region in the opening 1001.

Figure 26:
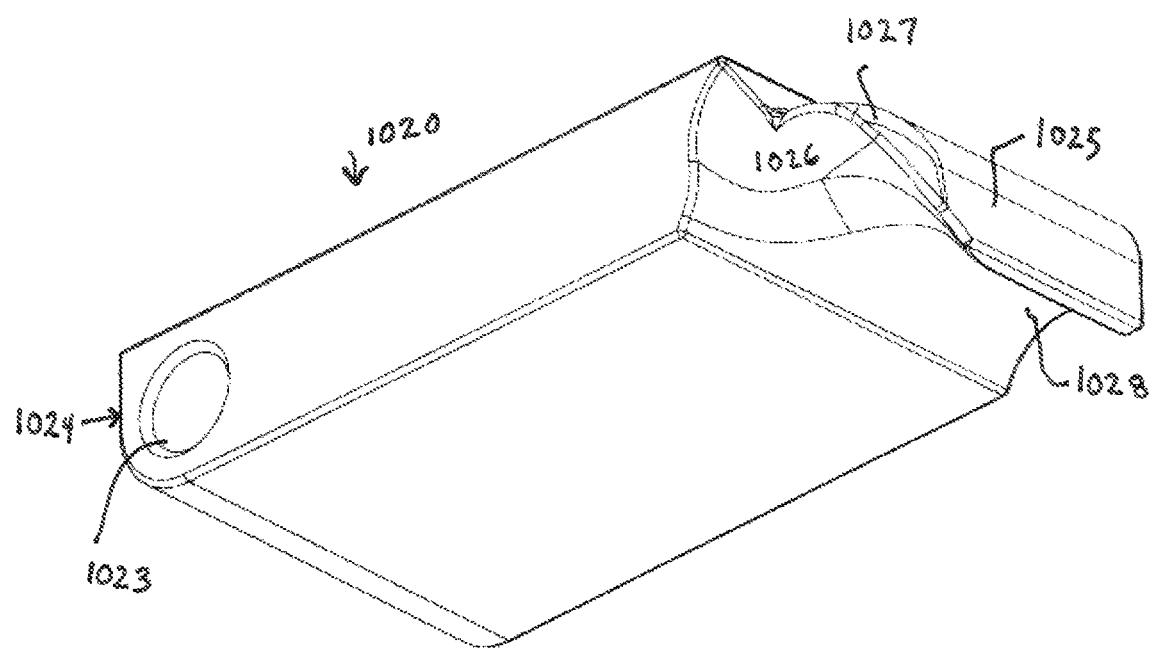
FIG. 26 is an isometric bottom view of the pivotable hinge rod retainer of FIGS. 22
Figure 27:
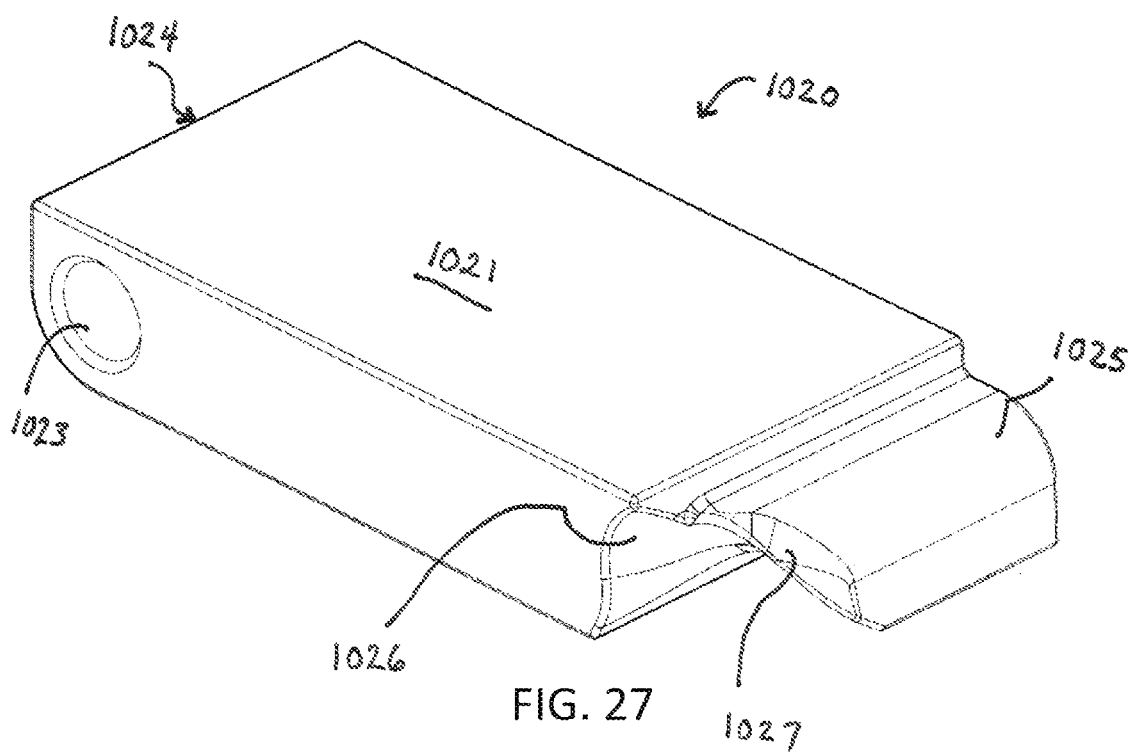
-FIG. 27 is an isometric top view of the pivotable hinge rod retainer of FIG. 26.

The trap door 1020, shown in detail in FIGS. 26 and 27, comprises a substantially planar main body configured to fit in the space 1001 of the module. While the illustrative main body and opening 1001 are cuboid in shape, the invention is not so limited. A lateral opening 1023 parallel to the hinge rod extends through the planar main body near a first end 1024 for receiving the pivot rod 1022 for mounting the trap door 1020 to the module 1000. At a second end, the trap door 1020 includes a shaped hook 1025. The shaped hook 1025 includes a swooping surface 1026 and an angled cup portion 1027. The majority of the shaped hook 1025 forms an open channel 1028 that aligns with the hinge rod passageway and receives the end of the hinge rod 1030 in the operating position.

To remove the hinge rod 1030, a user pushes the trap door 1020 down, so that the swooping surface 1026 and angled cup portion 1027 push and bend the end of the hinge rod out of the channel 1028, exposing the end of the hinge rod 1030 and allowing access to a user for removal.

The trap door 1020 may include a latch to secure the trap door in a selected position.

Figure 28:
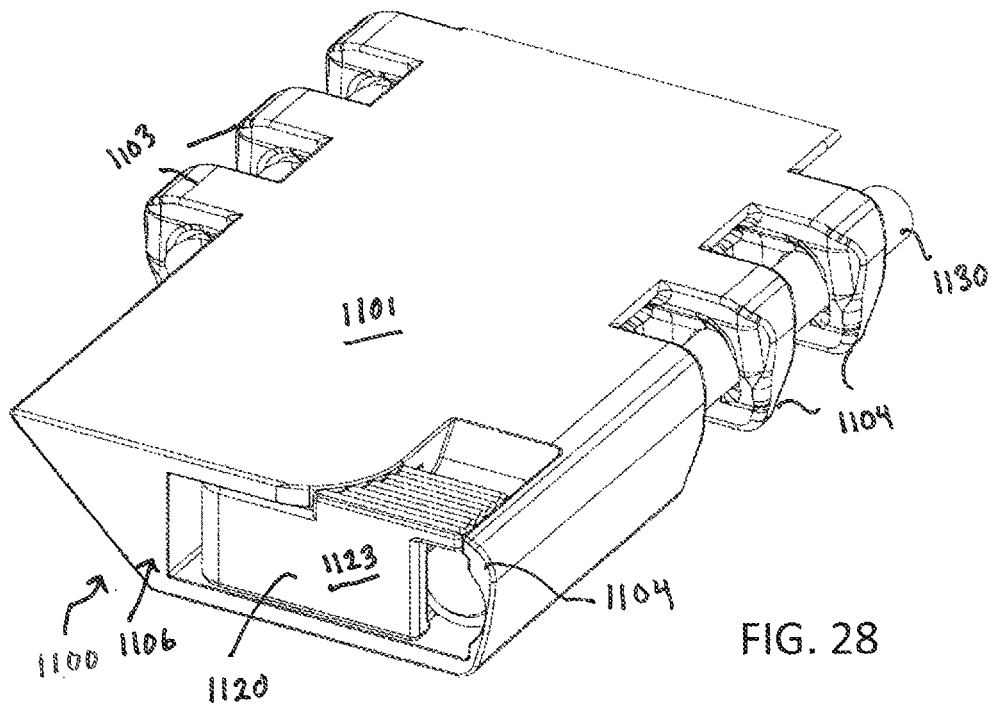
FIG. 28 is an isometric top view of a conveyor belt module including a pivotable rod retainer in a closed position.
Figure 29:
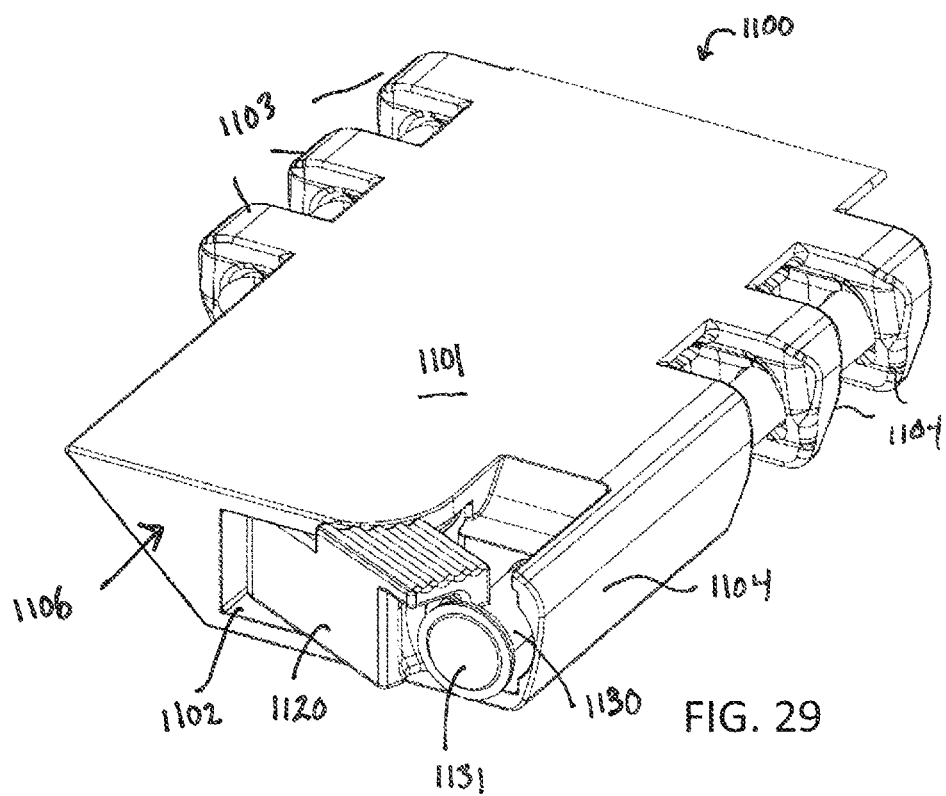
FIG. 29 is an isometric top view of the conveyor belt module of FIG. 28 with the pivotable rod retainer in an open position.
Figure 30:
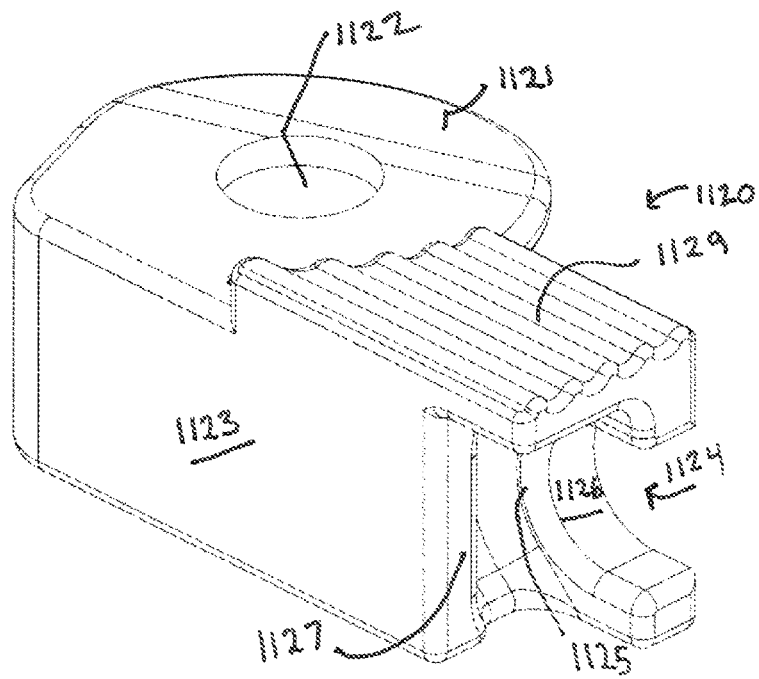
FIG. 30 is an isometric view of the pivotable rod retainer of FIGS. 28-29.
Figure 31:
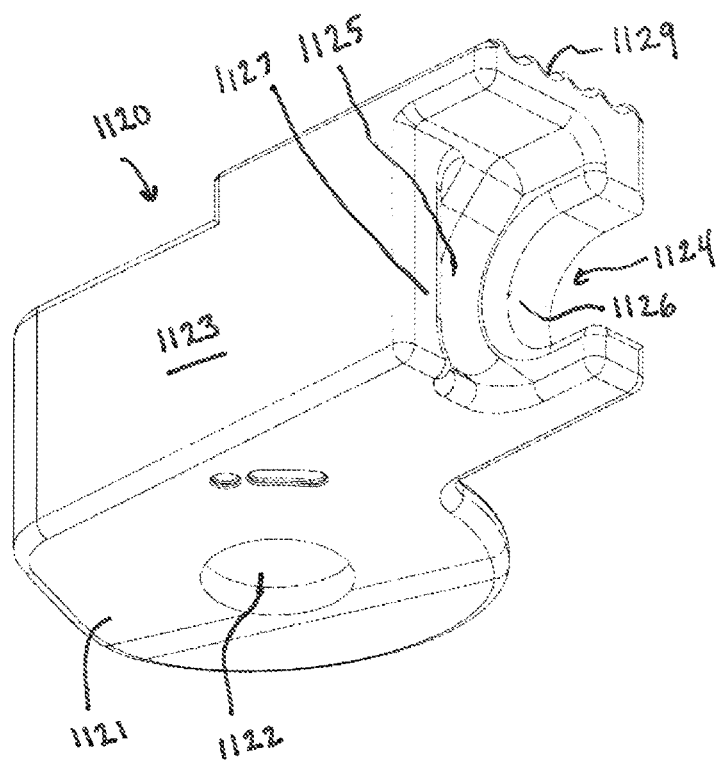
FIG. 31 is an isometric bottom view of the pivotable rod retainer of FIG. 30.

FIGS. 28-29 show another version of a conveyor belt module 1100 including a pivotable hinge rod retainer 1120, shown in FIGS. 30-31. The conveyor belt module 1100 includes a module body including a top conveying surface 1101 and hinge elements 1103, 1104 extending longitudinally from first and second ends of the body. An edge region includes a compartment 1102 forming a niche for pivotably mounting the hinge rod retainer 1120. In a closed position, shown in FIG. 28, the hinge rod retainer 1120 blocks a hinge rod 1030 in a hinge passageway formed by hinge elements 1104. In an open position, shown in FIG. 29, the hinge rod retainer 1120 pulls the end of the hinge rod 1030 out of the hinge passageway, exposing the end so a user can grasp and remove the hinge rod.

Referring to FIGS. 30 and 31, the illustrative hinge rod retainer 1120 includes a base portion 1121 including an opening 1122 for a pivot rod. The opening 1122 extends perpendicular to the axis of the hinge passageway. Alternatively, pivot nubs extend from the base portion 1121 to pivotally mount the hinge rod retainer 1120 within the compartment 1102. A flat outer wall 1123 of the hinge rod retainer 1120 is configured to sit flush with the side edge 1106 of the module 1100 when the hinge rod retainer is in the closed position. The hinge rod retainer further includes a seat 1124 for the end of a hinge rod 1030. The illustrative hinge rod 1030 includes a head 1131 configured to be received in the seat 1124. The seat 1124 includes a semicircular shelf 1125 for seating the head 1131 and a semicircular opening formed by curved surface 1126 allowing the stem of the hinge rod to pass through. An outer edge 1127 retains the head 1131 within the seat 1124. A ridged top surface 1129 forms a grip allowing a user to easily pivot the hinge rod retainer between a closed, operating position, and an open position. In the closed position, the seat 1124, outer edge 1127 and a wall 1104 forming an end of the module and defining an end of the compartment 1102 cooperate to retain the hinge rod 1130. In the open position, the seat 1124 pulls the hinge rod away from the hinge passageway, allowing a user to pull the head 1131 out of the open seat 1124.

Figure 32:
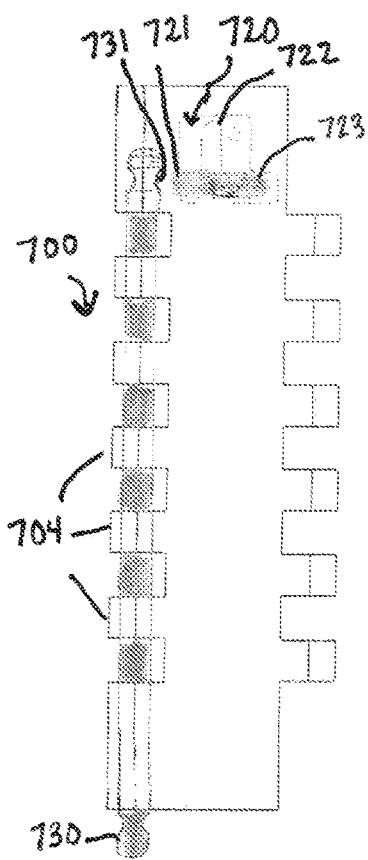
FIG. 32 is a top view of a conveyor belt module including a movable hinge rod retainer in an open, exposed position.
Figure 33:
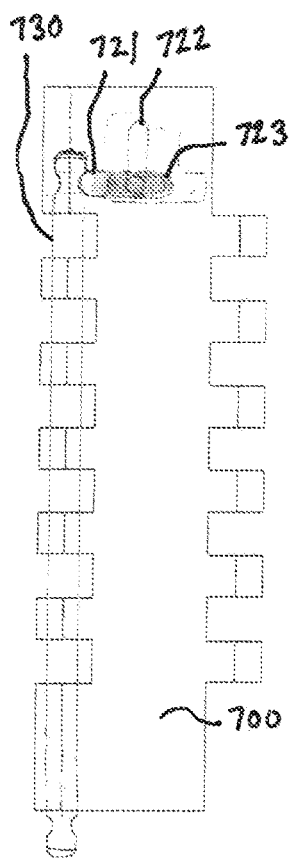
FIG. 33 is a top view of the conveyor belt module of FIG. 32 with the hinge rod locked by the hinge rod retainer.
Figure 34:
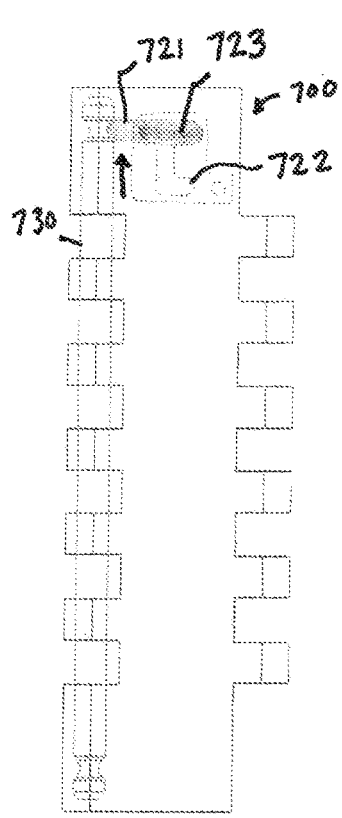
FIG. 34 is a top view of the conveyor belt module of FIG. 32 with the hinge rod in a locked, retracted position.

FIGS. 32-34 show another embodiment of a conveyor belt module 700 employing a movable hinge rod retainer 720 for selectively locking a hinge rod 730 within a hinge passageway formed by hinge elements 704 and selectively opening the hinge passageway and providing access for easily removing the hinge rod 730. The illustrative retainer 720 comprises a protrusion 721 that may selectively engage a recess 731 or other feature in the hinge rod 730. The protrusion 721 may move along an L-shaped path formed by an L-shaped channel 722 using a connected button 723 or other device. In an exposed position, shown in FIG. 32, the hinge passageway is open, and the hinge rod 730 can move into and out of the hinge passageway. The button 723 and protrusion 721 are retracted by the lower leg of the channel 722 in this position. To retain the hinge rod 730, a user slides the button 723 towards the hinge rod 730 so that the protrusion 721 engages the recess 731 on the hinge rod 730, as shown in FIG. 33. Then, the user slides the button 723 towards the outer edge of the module, pulling the hinge rod into the passageway, as shown in FIG. 34. The button 723 may be locked in the retracted position, preventing escape of the hinge rod. The hinge rod 730 may be easily unlocked and removed by sliding the button 723 to the other end of the L-shaped channel, which pushes the end of the hinge rod 730 out of the hinge passageway and allows a user to easily remove it.

Figure 35:
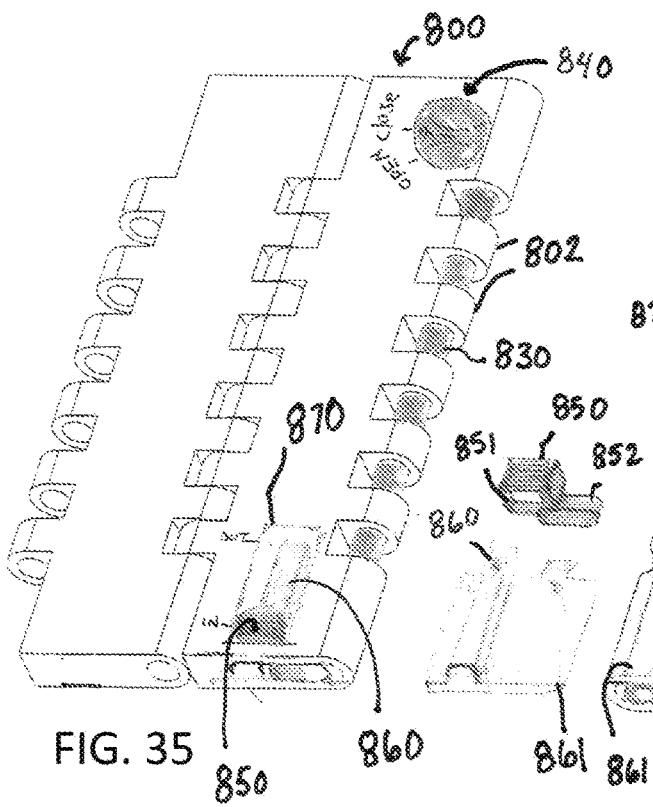
FIG. 35 is an isometric top view of a pair of conveyor belt modules, with one module including a movable hinge rod retainer.
Figure 36:
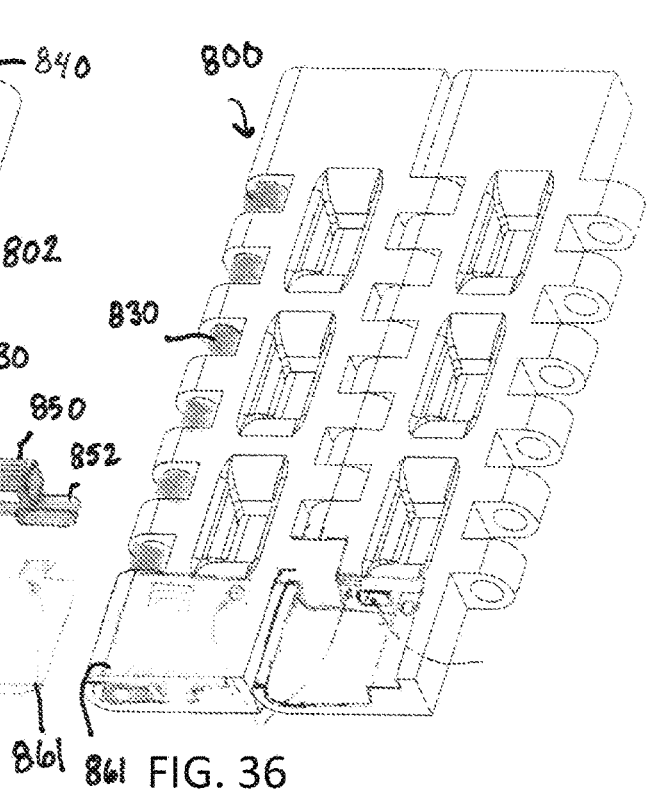
FIG. 36 is a bottom view of the pair of conveyor belt modules of FIG. 35.

FIGS. 35-36 show another embodiment of a conveyor belt module 800 employing a movable hinge rod retainer for selectively locking a hinge rod 830 within a hinge passageway and selectively exposing the hinge rod 830 to facilitate removal of the hinge rod 830. The conveyor belt module 800 includes a rotatable rod occluder 840 adjacent to a hinge passageway formed by hinge elements 802 and formed adjacent to a side edge of the module 800. The rotatable rod occluder 840 is configured to selectively block the hinge passageway when oriented in a "closed" position. When the rotatable rod occluder 840 is oriented to an "open" position, the hinge passageway is open to allow passage of a hinge rod. The Conveyor belt module 800 further includes a rod pusher 850 that can slide over a guide rail 860 to selectively engage and push a hinge rod 830 out of the hinge passageway when the rod occluder 840 is open. The rail 860 extends from a base 861 that can snap into the bottom of the module 800, such that the rail 860 extends parallel to the hinge rod passageway and sits in an opening 870 in a side edge portion of the module 800. The rod pusher 850 includes a rail-receiving portion 851 extending up and movable through the opening 870. The top of the rail-receiving portion 851 may be textured to form a grip to facilitate sliding. A pushing portion 852 engages the hinge rod 830 to push the hinge rod 830 out of the hinge passageway when a user slides the rail-receiving portion 851 over the rail 860.

An advantage of the illustrative hinge rod retainers is their integration with the conveyor belt module. The hinge rod retainers remain with the belt even when the hinge rod is removed or about to be installed. The ability to open and close the conveyor belt without requiring additional tools facilitates operation and reduces concerns about losing or dropping the tool, or having the tool contaminate the articles conveyed by the conveyor belt.

The invention has been described relative to certain illustrative embodiments, though those skilled in the art will recognize that modifications may be made without departing from the scope of the invention.

What is claimed is:

1. A conveyor belt module comprising:
   a body extending in thickness from a top conveying surface to an opposite bottom surface, laterally from a first edge to a second edge and longitudinally from a first end to a second end, the body including a first set of hinge elements spaced apart along the first end and defining a first rod passageway, a second set of hinge elements spaced along the second end and defining a second rod passageway and a recess in the body between the top conveying surface and the opposite bottom surface, the recess intersecting the first rod passageway; and
   a pivotable hinge rod retainer for a hinge rod seated in the recess and mounted on a hinge rod extending through the second rod passageway, wherein the pivotable hinge rod retainer pivots between a closed position blocking the first rod passageway and an open position in which the first rod passageway is open.

2. The conveyor belt module of claim 1, wherein the pivotable hinge rod retainer further comprises a body that splits to form two arms including keyhole-shaped openings for snapping onto the hinge rod.

3. The conveyor belt module of claim 1, wherein the pivotable rod retainer further comprises a latching tab and the recess includes an opening for receiving the latching tab via a snap-fit connection.

4. The conveyor belt module of claim 1, wherein the module body and the pivotable rod retainer include magnets forming a latch.

5. The conveyor belt module of claim 1, wherein the pivotable hinge rod retainer includes a base with an opening for receiving the second hinge rod, a head including a rod recess closed by a wall for blocking the first rod passageway and a neck connecting the head and the base.

6. The conveyor belt module of claim 5, wherein the recess in the body includes side walls, a substantially horizontal surface for abutting a bottom surface of the neck, a sloped surface for abutting a rear surface of the head and a flat bottom surface extending to the first edge of the module body.

\* \* \* \* \*